INVENTOR.
EVERETT GORIN
BY
Harry B. Keck
ATTORNEY

INVENTOR.
EVERETT GORIN
BY
Harry B. Keck
ATTORNEY

INVENTOR.
EVERETT GORIN
BY
Harry B. Keck
ATTORNEY

United States Patent Office
2,840,462
Patented June 24, 1958

2,840,462

PRODUCTION OF HIGH BTU-CONTENT GAS FROM CARBONACEOUS SOLID FUELS

Everett Gorin, Pittsburgh, Pa., assignor to Pittsburgh Consolidation Coal Company, Pittsburgh, Pa., a corporation of Pennsylvania Application May 12, 1955, Serial No. 507,813

5 Claims. (Cl. 48—197)

The present invention relates to a process for preparing high B. t. u.-content gas from carbonaceous solid fuels.

Processes for the complete conversion of carbon to gases normally produce a product gas having a low B. t. u. value. Conventional water gas, for example, which has a heating value of about 300 B. t. u. per cubic foot, must compete commercially with natural gas having a heating value of about 1000 B. t. u. per cubic foot.

Typical gas analyses for various commercially available gaseous fuels are shown in Table I.

TABLE I

| Gas | Heating Value, B. t. u./cu. ft. | Percentage Composition | | | | |
|---|---|---|---|---|---|---|
| | | CO | H₂ | CH₄ | C₂H₆ | Inert |
| Blue gas | 287 | 37.3 | 47.6 | 1.3 | | 13.8 |
| Coke oven gas | 534 | 17.7 | 53.6 | 22.6 | 4.1 | 2.0 |
| Natural gas | 1,115 | | | 83.0 | 16.0 | 1.0 |

It is apparent from Table I that the presence of methane and the absence of hydrogen, carbon monoxide and inert gases are the primary considerations in increasing B. t. u. content of gases. Hence maximizing methane content and minimizing CO and $H_2$ content will increase the B. t. u. content of product gas.

Carburetion of water gas has been carried out in the past to increase its heating value; the maximum enhanced heating value via carburetion, which is additional rather than substitutional, is limited to about 600 B. t. u. per cubic foot because of the high fraction of hydrogen and carbon monoxide in the initial water gas. Methanization of water gas via the Fischer-Tropsch reaction also has been proposed for enhancing the heating value of gases produced from carbonaceous solids through conversion of CO and $H_2$ to methane.

The endothermic nature of the water gas reaction $$C + H_2O \rightarrow CO + H_2$$

requires costly addition of heat to the first stage in the production of gases from carbon by conventional methods. Heat required to compensate for the endothermic character of the reaction has been supplied by alternating the gas make cycles with carbon combustion cycles or by combining the steam-carbon reaction with an oxygen-carbon reaction which requires highly purified oxygen gas, an expensive reactant.

It is an object of the present invention to provide a method for making high B. t. u.-content gases from carbonaceous solid fuels by an essentially thermoneutral process which does not require the use of extrinsic oxygen to supply the heat necessary to balance the endothermic steam-carbon reaction.

In accordance with the present invention, the endothermic reaction between steam and carbonaceous solid fuels is carried out concurrently with the exothermic carbon-hydrogen reaction to permit the excess heat from the hydrogenation reaction to supply the thermal requirements of the gasification stage. In order that the heat from the hydrogenation reaction be available for use in the gasification stage, it is essential that the hydrogenation of carbonaceous solid fuels be carried out at a temperature in excess of that of the gasification. The exchange of heat between the two reaction systems can be effected by continuously circulating hot carbonaceous solid fuels between the vessels in which the two reactions are carried out; alternatively the overall reaction may be carried out in one vessel having baffle-separated gasification and carbon hydrogenation zones. It is necessary that both reactions be carried out at a pressure in excess of 30 atmospheres in order to obtain hydrogenation reaction rates sufficient to assure a thermal balance between the two processes.

It is also possible to carry out my present invention in two separate vessels without requiring the circulation of solids between them. Each vessel would be alternately blown with steam (for the endothermic reaction producing hydrogen) and thereafter with hydrogen (for the exothermic reaction producing methane). When one vessel is blown with steam, the other is blown with hydrogen.

In conventional water gas preparation the reaction between steam and carbonaceous solid fuels is carried out at temperatures of 1700° F. and above to take advantage of the favorable improvement of the steam-carbon reaction rate with increasing temperature. In order to maintain this elevated temperature, heat must be added continuously to the gasification reaction vessel to supply the heat requirements of the reaction itself. The gases resulting from such conventional water gas operations are low in B. t. u. content, comprising principally CO, $H_2$ and unreacted steam.

I have found that by carrying out the steam-carbon gasification reaction at temperatures below 1700° F., the reaction proceeds at a reduced but satisfactory rate; the product gases remain low in B. t. u. content, although the lower temperature favors the formation of $CH_4$ as a side-reaction in the gasification system. At 1600° F. and pressures of 30 or more atmospheres, the reaction of steam and carbon (65% steam conversion) produces as product a gas containing 14.5 percent methane. Since the methane forming side reaction is exothermic, the heat requirements of the steam-carbon gasification stage are further reduced by virtue of this methanization heat released in situ. Even at temperatures below 1600° F., the gases resulting from the carbon and steam reaction, nevertheless, contain principally carbon monoxide, hydrogen and unreacted steam—hence their B. t. u. content is low. A conventional water gas shift reaction $$CO + H_2O \rightarrow CO_2 + H_2$$

is carried out with the gasification product to convert the carbon monoxide and unreacted steam to additional hydrogen gas. Removal of carbon dioxide from the resulting vapors can be readily accomplished through any of the well-known suitable methods. The remaining gas, principally hydrogen, thereupon is passed through a carbon hydrogenation vessel in which the hydrogen is permitted to react exothermically with carbonaceous solid fuels to produce methane.

$$2H_2 + C \rightarrow CH_4$$

The gases recovered from the carbon hydrogenation reaction are principally unreacted hydrogen and methane; the latter is recovered as product and the former is recycled to the char hydrogenation vessel to effect further carbon conversion and heat generation.

By maintaining the temperature of the carbon hydrogenation vessel above that of the steam-carbon reaction vessel, it is possible to conduct the overall process under essentially thermoneutral conditions. Hot carbonaceous solids from the hydrogenation vessel are circulated to the gasification vessel to supply the heat requirements of the endothermic steam-carbon reaction. Cooled carbonaceous solids from the gasification vessel are returned to the hydrogenation vessel to absorb heat from the exothermic carbon-hydrogen reaction.

Maintenance of essentially thermoneutral conditions for the overall reaction requires that the gasification reaction be conducted at a temperature below about 1600° F. while the hydrogenation reaction is correspondingly conducted below about 1680° F. (but above the temperature of the gasification reaction). Where the reaction temperatures exceed these values, an extrinsic source of heat must be supplied, although such extrinsic heat is considerably less than that required in conventional gas-making processes.

The feed material in my present process is carbonaceous solid fuel which is readily susceptible to reaction with steam and with hydrogen. Preferably the carbonaceous material selected as feed material contains in excess of ten percent by weight of volatile matter. Any and all ranks of coal are suitable as feed material (lignite through anthracite) provided the coal has not been exposed to a temperature in excess of about 1600° F. prior to entering my present gas-making system. The solid char resulting from low temperature carbonization of bituminous coal, for example, is an excellent feed material. Less reactive forms of carbonaceous solid fuels may be artificially activated, for example, by impregnation with a suitable gasification catalyst such as $Na_2CO_3$. It may be advantageous in any case to employ a catalytically activated form of carbon.

For a clear understanding of the present invention, its objects and advantages, reference should be had to the following description and accompanying drawings in which.

Figure 1:
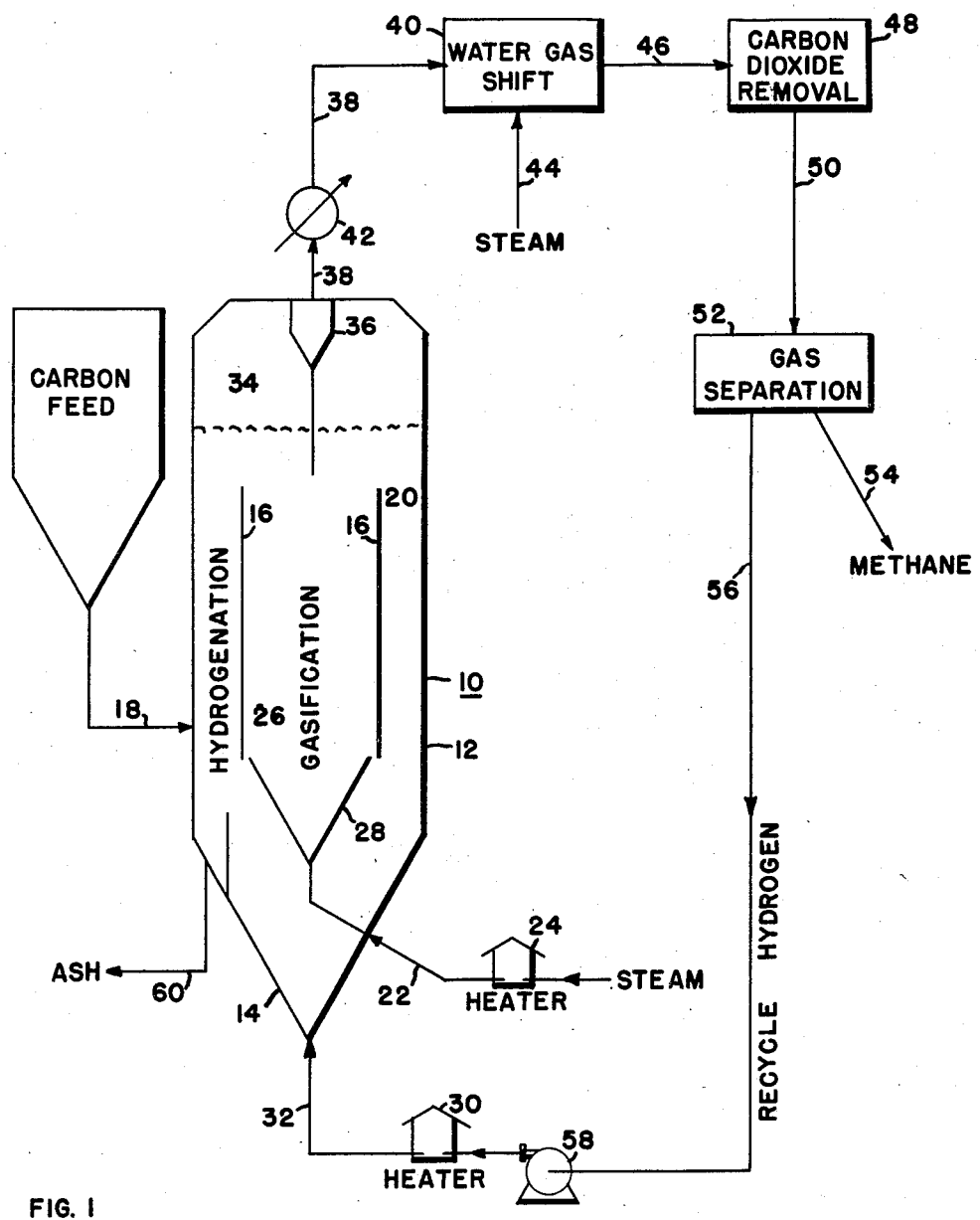
Figure 1 is a diagrammatic illustration of apparatus adapted to the practice of the preferred embodiment of my invention.

Referring to Figure 1, the preferred embodiment of the present invention is illustrated as a single vessel system in which the steam carbon reaction zone and the carbon hydrogenation zone are maintained in a common fluidized bed separated by appropriate baffles. The primary reaction vessel 10, having vertical side walls 12 and conical bottom walls 14, is adapted to confine a bed of fluidized solids under elevated pressures. A suitably supported vertical cylindrical baffle 16 is provided for forming two concentric zones within the vessel 12 which comprise a hydrogenation zone 20 and a gasification zone 26. Solids within the vessel 10 are in open communication with both reaction zones. Finely divided carbonaceous solid fuels are introduced into the vessel 10 through a conduit 18.

Steam for the steam-carbon reaction enters the vessel through a conduit 22 preheated, for example, in a heater 24, to a temperature as close as feasible to the gasification reaction temperature. Introduction of steam into the vessel 10 is restricted to the central gasification zone 26 by the dispersing cone 28. Solids from the hydrogenation zone 20 enter the gasification zone 26 upwardly through the narrow space between the steam introduction cone 28 and the cylindrical baffle walls 16. The upward linear velocity of the steam (0.3 to 3.0 feet per second) in the zone 26 is sufficient to maintain the solids therein under fluidized conditions. The temperature within the gasification zone 26 is maintained within the range 1450 to 1600° F. Carbonaceous solids from the gasification zone 26 overflow the top of the cylindrical baffle 16 and flow downwardly through the annular hydrogenation zone 20. Hydrogen, which has been heated to the reaction temperature, for example, in a heater 30, is introduced into the bottom of the vessel 10 through a conduit 32. The upward linear velocity of the hydrogen gas (0.3 to 3.0 feet per second) is sufficient to maintain the solids in the hydrogenation zone 20 under fluidized conditions. The annular hydrogenation zone is maintained within the range 1550 to 1700° F., at a value which is 20 to 100° F. above the temperature of the gasification zone 26.

The embodiment of this invention illustrated in Figure 1 permits reaction with a minimum temperature differential between the gasification and hydrogenation zones, by permitting a maximum circulation rate of solids between the two zones. Thus the hydrogenation reaction can be conducted at the lowest temperature and the gasification reaction can be conducted at the highest temperature consistent with the required heat flow from the hydrogenation zone to the gasification zone. The temperature differential between the two zones preferably is maintained at a value as low as possible within the range 20 to 100° F.

Product gases from both stages are intermingled in a solids disengaging section 34 above the fluidized dense phase bed. The resulting gases are freed of solids in a cyclone separator 36 and passed through a conduit 38 to a water gas shift reactor 40. A heat exchanger 42 is provided in the conduit 38 for use in generating the required process steam. Additional steam is introduced into the water gas shift reactor 40 through a conduit 44 to promote a favorable shift equilibrium in the water gas shift reactor. The gases leaving the water gas shift reactor 40 through conduit 46 comprise essentially hydrogen, unreacted steam, carbon dioxide, methane and small amounts of carbon monoxide. Removal of the carbon dioxide can be effected by any of the well-known suitable methods indicated schematically at 48, for example, by scrubbing gases with $CO_2$ absorbants such as diethanolamine. The gas recovered from the carbon dioxide removal system 48 through conduit 50 comprises essentially hydrogen and methane. A fractional condensation of the gases is carried out in refrigerating apparatus 52 by cooling the gases to a temperature below the atmospheric boiling point of methane. The methane is evaporated in the refrigerating apparatus 52 and removed as a gas through a conduit 54. The non-condensed hydrogen is recovered as a gas through a conduit 56, and, following recompression in a pump 28, and reheating in a heater 30, is available for recycle to the hydrogenation reaction zone 20.

Carbon-depleted solids can be recovered from the vessel 10 through a conduit 60 at a rate corresponding to the rate of introduction of fresh carbon through the conduit 18. If desired, low carbon solids from the conduit 60 may be burned to supply extrinsic heat, for example, to heat the reactant gases, or the thus-heated solids may be returned to the reaction vessel 10 for heat liberation in situ. In general, the solids removed through the conduit 60 will have a carbon burnoff of 80 to 90 percent. Carbon burnoff is the dividend (expressed as a percentage) obtained when the weight of carbon in the feed material is divided into the weight of carbon consumed in reaction.

In order to arrive at the desired thermoneutral operation, maximum practical preheat of all reactant materials entering the system should be achieved. Preferably all reactants should be heated to within about 100° F. or less of the reaction temperatures. This may be accomplished by very efficient heat exchange of hot products with incoming reactants; pebble heaters, for example, will give very efficient heat exchange. Some extrinsic sources of heating may be employed to provide the necessary reactant preheat.

Figure 2:
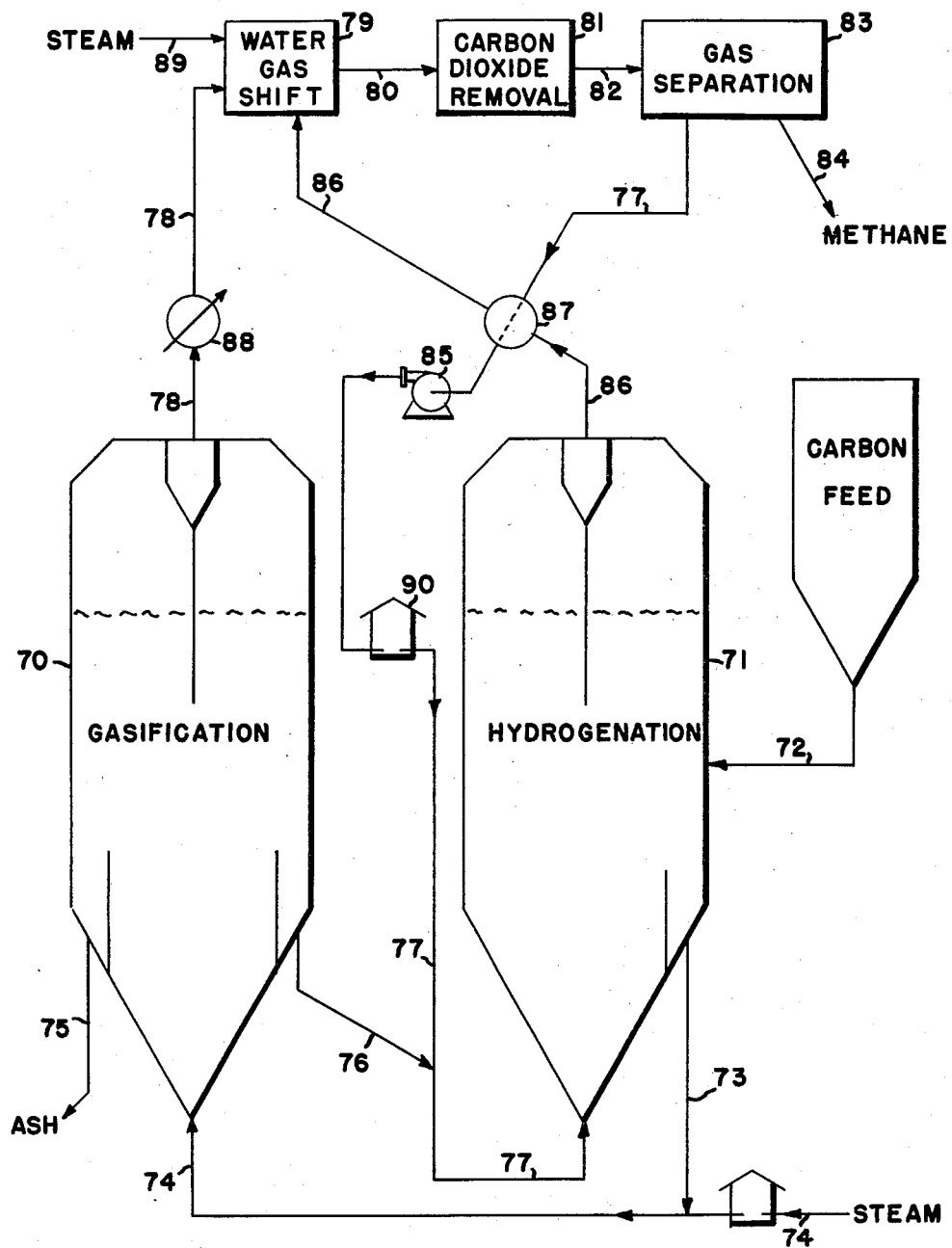
Figure 2 is a diagrammatic illustration of apparatus adapted to the practice of an alternate embodiment of my invention.

Referring to Figure 2, an alternative embodiment of the present invention is illustrated as a two-vessel process employing the fluidized solids technique. A gasification vessel 70 is provided for confining a fluidized bed of finely divided carbonaceous solid fuel at a temperature in the range 1450 to 1600° F. and at a pressure of 30 or more atmospheres. A hydrogenation reaction vessel 71 is provided for confining a fluidized bed of finely divided carbonaceous solid fuel at a temperature in the range 1550 to 1700° F. and at a pressure of 30 or more atmospheres. Finely divided carbonaceous solid fuels are introduced into the hydrogenation vessel 71 through a conduit 72. Hot solids from the hydrogenation vessel 71 are withdrawn through a conduit 73, suspended in preheated steam flowing through a conduit 74, and introduced as a dilute phase suspension into the gasification vessel 70, where the steam serves to maintain solids in a fluidized state. A portion of the solids from the gasification vessel 70 is withdrawn through an ash removal conduit 75 for disposal at a rate corresponding to that at which fresh carbonaceous solids are introduced into the system through conduit 72. Solids withdrawn through conduit 75 may be burned to supply extrinsic heat, for example, to heat incoming reactants; the thus-heated solids may be returned to the gasification vessel 70 to supply heat in situ. These solids have a carbon burnoff of 80 to 90 percent. Additional solids from the gasification vessel 70 are withdrawn through the conduit 76, entrained in a stream of preheated hydrogen gas flowing in the conduit 77 and carried in suspension into the char hydrogenation vessel 71, where the reactant hydrogen gas also serves to maintain solids in a fluidized state.

In the gasification reactor 70, steam and carbon are converted to CO and $H_2$ by the conventional water gas reaction. Some $CO_2$ and $CH_4$ also appear in the product gases. At the temperatures and pressures prescribed a steam conversion of 50 to 65 percent can be obtained. Product gases issuing from the gasification vessel 70 through a conduit 78 pass through a heat exchanger 88 for generation of process steam. The cooled product gas passes through a water gas shift reaction stage 79 in which carbon monoxide and unreacted steam are converted to hydrogen and carbon dioxide which flows through a conduit 80 to a carbon dioxide removal stage 81. Additional steam should be added to the gases through conduit 89 to promote a favorable shift equilibrium.

Following removal of carbon dioxide at 81, the remaining gas, consisting essentially of hydrogen, passes through a conduit 82 to a low temperature gas separation stage 83.

Product gases from the hydrogenation vessel 71, containing hydrogen and methane, pass through a conduit 86 and a heat exchanger 87 to the water gas shift reactor 79, thence through conduit 80 to the $CO_2$ removal system 81 which also inherently serves to remove $H_2S$ from the gases. Hydrogen and methane thereupon pass through the conduit 82 to the low temperature separation stage 83, where a fractional condensation at temperatures below the atmospheric boiling point of methane is carried out to separate methane from hydrogen. Methane is removed through conduit 84 as a high B. t. u. content product gas and hydrogen is recycled through conduit 77. The recycle hydrogen may be preheated by exchange with hot hydrogenation gases in the exchanger 87. A pump 85 is provided in the conduit 77 for recompression of the recycle hydrogen to a pressure in excess of 30 atmospheres. Additional heat can be supplied to the recycle hydrogen in a heater 90.

In this embodiment I prefer to conduct the gasification reaction in the vessel 70 at a temperature of 1450 to 1600° F., a temperature range well below that normally associated with the preparation of water gas. Further I prefer to operate the carbon hydrogenation reaction in the vessel 71 at a temperature of 1550 to 1700° F. The hydrogenation reaction in all cases should be carried out at a temperature of about 20 to 100° F. above the gasification reaction temperature in order to supply heat at an available temperature level. A low temperature differential can be maintained through rapid solids circulation between the vessels 70 and 71.

In order to obtain the necessary reaction between hydrogen and carbon in vessel 71 required to supply the heat for the endothermic gasification reaction, moreover, it is necessary that the overall process be conducted at a pressure in excess of about 30 atmospheres for two reasons. First, the rate at which hydrogen reacts with carbon to produce methane and supply the required heat thereby increases with pressure. Second, increased pressure results in methane formation in the gasification zone which reduces the heat required to maintain the desired gasification temperature. The overall process will be deficient in heat if conducted at pressures below about 30 atmospheres.

I prefer to employ as the carbonaceous solids feed material the char resulting from low temperature carbonization of bituminous coal. I prefer to introduce this material into the carbon conversion system at an elevated temperature. Ideally the carbonaceous solids would be the hot product char stream issuing from a fluidized low temperature carbonization process. Such carbonaceous solids are reactive, are finely divided, suitable for further processing by the fluidizing technique, and are already at an elevated temperature of about 800 to 1100° F. If desired, the low temperature carbonization char can be devolatilized and/or desulfurized prior to entering my new gas-making process. The carbonaceous solids may be impregnated with a gasification catalyst such as $Na_2CO_3$ or $CaCl_2$ if desired.

The rate at which carbonaceous solids are transferred through the conduits 74 and 77 depends upon material balances and thermal balances of the system. With low circulation rates, a high temperature differential between the vessels 70 and 71 must be maintained. With higher circulation rates, the temperature differential may be reduced. The temperature differential should be within the range 20 to 100° F.

For heat economy, hot products leaving the system should be subjected to heat exchange with cold reactants entering the system. Incoming reactant gases, for example, preferably are preheated to about 1250° F. or higher; incoming carbon-containing solids preferably are preheated to about 900° F. or higher.

Figure 3:
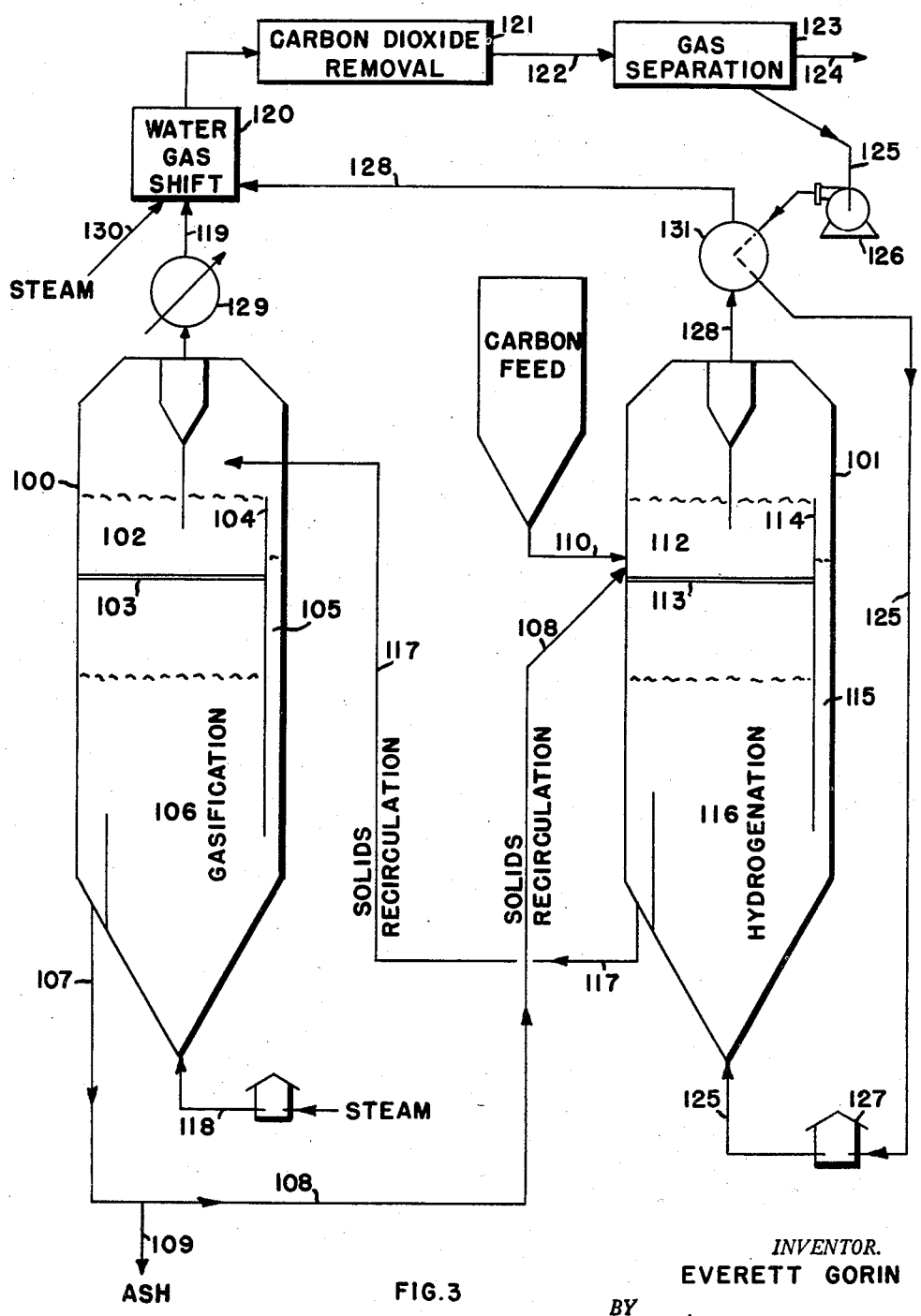
Figure 3 is a diagrammatic illustration of apparatus adapted to the practice of a further embodiment of my invention.

Another alternative embodiment of this invention is illustrated in Figure 3 wherein staged fluidized beds are employed in both the gasification vessel 100 and the hydrogenation vessel 101 to permit greater heat economy and to increase the methane production rate, consistent with thermoneutrality. In the gasification vessel 100, an upper bed 102 of carbonaceous solids above a grid 103 is maintained at a temperature of about 1600° F. Hot solids overflow a weir 104 and descend through a downcomer 105 to a lower fluidized bed 106, maintained at a lower temperature than that of the upper bed 102. Carbonaceous solids are withdrawn from the bed 106 through a conduit 107 and transferred through a conduit 108 to the hydrogenation vessel 101. A portion of the solids from conduit 107 is removed through conduit 109. These removed solids, having a carbon burnoff of 80 to 90 percent, may be burned to supply extrinsic heat if desired. Finely divided fresh carbonaceous solid fuels are introduced from conduit 110 into the hydrogenation vessel 101.

The upper bed 112 of carbonaceous solids in the hydrogenation vessel 101 is supported on a grid 113 and is maintained at an elevated temperature of about 1600° F. Preferably the bed 112 should be maintained at about the same temperature as the upper bed 102 of the gasification vessel 100. Hot carbonaceous solids from the bed 112 overflow a weir 114 and descend through a downcomer 115 to the lower bed 116 maintained at a temperature above that of the upper bed 112. Hot solids are withdrawn from the lower bed 116 through conduit 117 and transferred to the upper bed 102 of the gasification vessel 100.

Referring to the gasification vessel 100, preheated steam is introduced through conduit 118 into the bottom of the lower bed 106 for reaction with carbon contained therein and for maintaining the solids in a fluidized state. While the lower temperature in the bed 106 tends to reduce reaction rate, the accompanying lower steam conversion rate results in a lower gasification inhibition due to hydrogen. Hence gasification proceeds at a satisfactory rate. Gases leaving the bed 106, containing principally $H_2$, CO and unreacted steam, pass upwardly through the grid 103 into the upper bed 102 for furthering the reaction of the steam and to maintain the solids in the bed 102 in a fluidized state. The higher temperature of the bed 102 results in an increased reaction rate. Hot gases leave the bed 102 through a conduit 119 and a heat exchanger 129 to a water gas shift stage 120 where the CO and unreacted steam yield additional $H_2$. Additional steam is added to the gases through conduit 130 for a more favorable shift equilibrium. Following removal of the resulting $CO_2$ by any suitable means 121, essentially pure hydrogen passes through conduit 122 to a low temperature gas separation stage 123.

In the gas separation stage 123, methane is separated from $H_2$ and recovered as a product through conduit 124. The residual $H_2$ is recycled through conduit 125, repressurized by a pump 126, reheated in heat exchanger 131, further heated in a heater 127, and introduced into the lower bed 116 of the hydrogenation vessel 101, maintained at the highest temperature of the system, up to about 1700° F. Hydrogen gas reacts with carbon in the bed 116 to produce methane which passes upwardly along with unreacted hydrogen through the grid 113 to the upper bed 112, maintained at a lower temperature than that of the lower bed 116. The high temperature of the bed 116 effects greater rates of reaction, but is accompanied by a low methane equilibrium gas concentration. The succeeding contact of the gases with carbon in the upper bed 112 at a lower temperature tends to increase the methane composition of the resulting gas since lower temperatures are conducive to higher methane equilibrium concentration. Product gas from the bed 112 passes through conduit 128 and heat exchanger 131 to the water gas shift reactor 120, thence to the $CO_2$ removal system 121 (which inherently removes $H_2S$ also) and thence to the gas separation stage 123 for elimination of methane from the hydrogen which is recycled through conduit 125. The recycle hydrogen may be preheated by exchange with hot hydrogenation gases in the heat exchanger 131.

Heat economy of the system illustrated in Figure 3 results from the availability of thermal energy inherent in the sequential heating and cooling pattern experienced by the carbon-containing solids as they move through the process. Incoming relatively cool solids move downwardly by gravity from the relatively low temperature of the bed 112 to the high temperature of the bed 116, thence to the lower temperatures of the bed 102 and finally downwardly by gravity to the lowest reaction temperature in the system—that of the bed 106. Thus the latent heat of descending solids at the temperature of the bed 102 is available to supply thermal energy to the solids in the bed 106, maintained at a lower temperature.

The increasing temperature pattern experienced by the steam in the gasification vessel 100 tends to increase the production of hydrogen; the decreasing temperature pattern experienced by the hydrogen in the hydrogenation vessel 101 tends to increase the production of ultimate product, methane. In order to obtain suitable rates of gas production, of course, it is essential that the pressure in the system be maintained at about 30 or more atmospheres.

Extrinsic hydrogen can be added to the system to increase the fraction of overall carbon consumption which occurs through exothermic reaction in the hydrogenation zone, thereby improving the heat balance of the process. An extrinsic hydrogen producing gasification process may be incorporated, or, if desired, the residual bed solids which are removed from the system may be gasified to yield hydrogen.

Another alternative is to add hydrogen to my new system "in the form of oxygen"—i. e., introducing small quantities of high purity oxygen into the gasification reaction vessel will increase the hydrogen production therein, will yield some exothermic heat in the gasification zone itself to reduce its heat requirements (hence reduce the system's hydrogen requirements), and will increase the fraction of overall consumption of carbon which occurs through exothermic reaction in the carbon hydrogenation zone.

Figure 4:
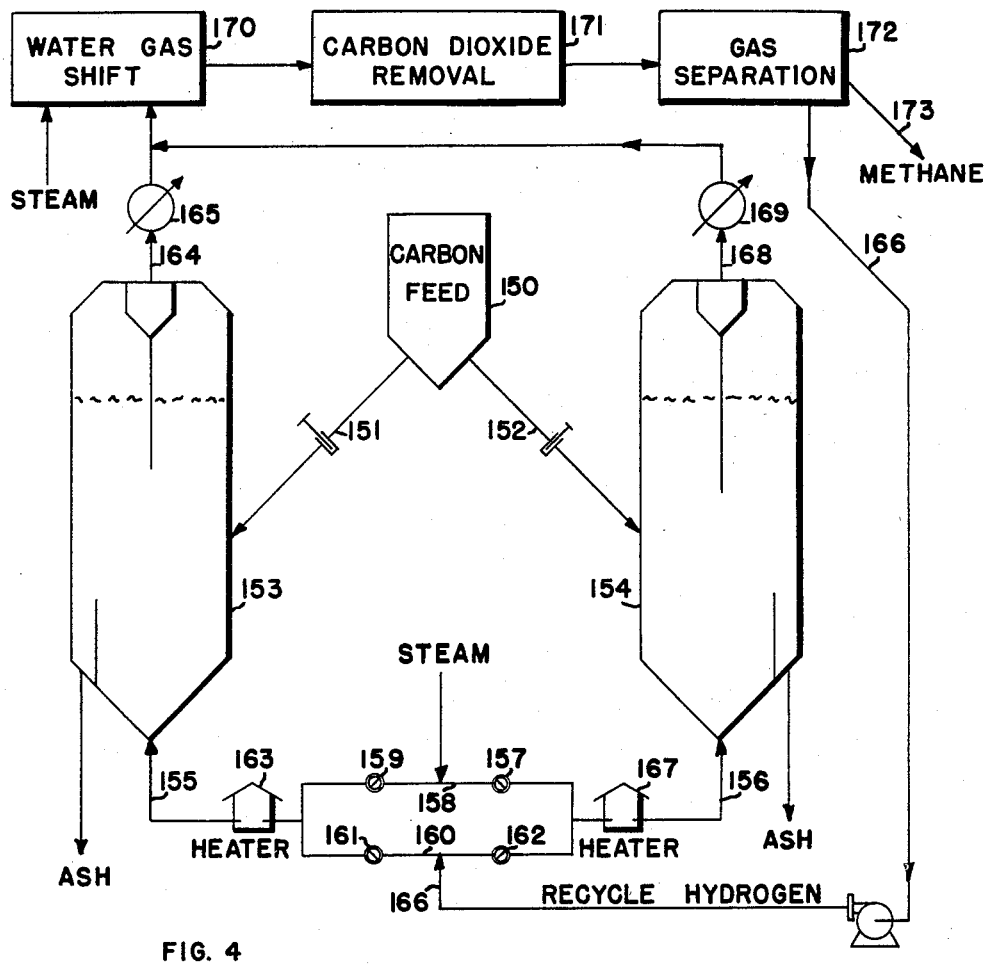
Figure 4 is a diagrammatic illustration of apparatus adapted to the practice of another embodiment of my invention.

A modification of the present invention, illustrated in Figure 4, provides a cyclic two-vessel gas making system which avoids the need for circulating solids between reaction vessels. According to the method of Figure 4, the gas making vessels are operated cyclically, as (1) steam-carbon reaction vessels and (2) carbon hydrogenation vessels. While the temperature of one vessel decreases from endothermic steam-carbon gasification, that of the other vessel increases from the exothermic carbon-hydrogenation. Both vessels are maintained at a pressure in excess of 30 atmospheres.

Carbonaceous solids are introduced from a supply hopper 150 through conduits 151 and 152 to reaction vessels 153 and 154 respectively. As illustrated in Figure 4, the reaction vessels 153 and 154 preferably are adapted for confining a fluidized reaction bed, although fixed beds or downwardly moving beds of carbonaceous solids may be employed. Gas inlet conduits 155 and 156 are provided at the bottom of the vessels 153 and 154 respectively for the introduction of reactant gases to the vessels 153 and 154. A steam conduit 158 having valves 157 and 159 communicates at its ends with the inlet conduits 155 and 156. A hydrogen conduit 160 having valves 161 and 162 also communicates at its ends with inlet conduits 155 and 156. The valves 157, 159, 161 and 162 are arranged so that the valves 59 and 162 are open when the valves 157 and 161 are closed, and vice versa. Steam is introduced into the steam conduit 158 between the valves 157 and 159. Hydrogen is introduced into the hydrogen conduit 160 between the valves 161 and 162.

When the valves 159 and 162 are open (valves 157 and 161 closed), steam enters the conduit 155 and, following necessary preheating in a heater 163, enters the vessel 153 operating at a temperature in the range 1450 to 1600° F. as a steam-carbon reaction vessel. Gasification products are recovered through a conduit 164 and cooled in a heat exchanger 165. Concurrently hydrogen gas is introduced from a hydrogen recycle conduit 166 into hydrogen conduit 160 and inlet conduit 156 to the vessel 154 operating at a temperature in the range 1550 to 1700° F. as a carbon hydrogenation vessel. The hydrogen may be preheated in a heater 167. Gaseous products from the carbon hydrogenation reaction are recovered through a conduit 168, cooled in a heat exchanger 169 and combined with the products of the steam-carbon reaction in conduit 164. The combined stream of gas is treated as previously described in a water gas shift reactor 170, a $CO_2$ removal system 171 and a low temperature separation system 172. Product methane gas is recovered through a conduit 173 and residual hydrogen recovered for recycle through conduit 166.

The cyclic switching of valves 159 and 162 to a closed position is accompanied by switching of the valves 157 and 161 to an open position to interchange the functioning of the two vessels 153 and 154.

Immediately following the switching of valves 157, 159, 161 and 162, the vessel which previously functioned as a steam-carbon reaction vessel is at a low temperature in the range 1450 to 1600° F.; the other vessel which previously functioned as a carbon hydrogenation vessel is at a high temperature in the range 1550 to 1700° F. The exothermic carbon hydrogenation reaction raises the temperature of the cooler vessel to a high level in the range 1550 to 1700° F.; at the same time the endothermic steam-carbon reaction extracts heat from the hot vessel to decrease its temperature to a low value in the range 1450 to 1650° F. When both vessels have experienced the temperature change, the valves 157, 159, 161 and 162 are again switched to repeat the cycle.

The embodiment of my present invention illustrated by Figure 4 permits realization of the benefits of thermoneutrality inherent in my discovery without requiring movement of abrasive solids between reaction vessels.

It may be desirable to treat the product gases of the steam-carbon reaction separately from those of the carbon hydrogenation, instead of treating the combined gases as described herein. This separate treatment of product gases may be accomplished in the embodiments illustrated in Figures 2, 3 and 4 by provision of dual gas treating equipment.

Figure 5:
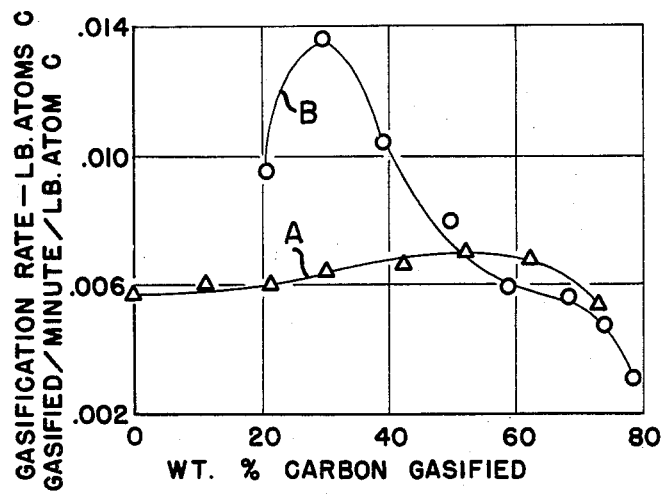
Figure 5 is a graphical illustration of an unexpected relation between carbon reactivity and percentage carbon gasification which operates to the advantage of the present invention.

Figure 5 illustrates graphically an inherent, unexpected advantage of my new system for producing high B. t. u. content gases from carbonaceous solid fuels. I have discovered that carbonaceous solid fuels which have been subjected to contact with steam at elevated temperatures exhibit a remarkably increased reactivity in the carbon-hydrogen reaction. To establish the correlation, shown in Figure 5, one sample of low temperature carbonization char was subjected to a preliminary devolatilization treatment in nitrogen gas at 1700° F. and 30 atmospheres pressure. The resulting devolatilized carbon then was contacted with pure hydrogen gas at 1700° F. and 30 atmospheres pressure. The rate of reaction, measured as the reaction proceeded, is shown graphically (curve A in Figure 5) as a function of the quantity of carbon consumed. As can be seen, the carbon conversion rate is nearly constant at about 0.006 lb.-atom of carbon gasified each minute per lb.-atom of carbon in the reaction bed.

A second sample of the same low temperature carbonization char was subjected to a preliminary devolatilization treatment in the presence of a gas containing 25 percent hydrogen and 75 percent steam (simulating the gases occurring in a water gas generator). This pretreatment also was carried out at 1700° F. and 30 atmospheres pressure until 20 percent of the carbon originally in the char had been consumed. The resulting carbon-containing solids then were contacted with pure hydrogen gas at 1700° F. and 30 atmospheres pressure as in the first test. The rate of reaction, measured as the reaction proceeded, is shown graphically (curve B in Figure 5) as a function of the quantity of carbon consumed. Unexpectedly the reaction rate has an initial value which is 50 percent greater than that of the nitrogen treated char. As reaction proceeds, the rate increases to a value which is 120 percent greater than that of nitrogen treated char.

In my present process, the carbonaceous solids inherently are treated alternately with steam and with hydrogen with the result that recycle char entering the hydrogenation zone is in an extremely reactive condition with respect to the hydrogenation reaction.

To illustrate the present invention, the following data are presented for the production of gas in accordance with the method illustrated in Figure 2.

A Pittsburgh seam bituminous coal is subjected to fluidized low temperature carbonization at 950° F. and substantially atmospheric pressure. The resulting char, with a heat of combustion of 13,250 B. t. u./lb., has the following elementary analysis:

| Element: | Content, percent by wt. |
|---|---|
| Carbon | 77.82 |
| Hydrogen | 3.32 |
| Nitrogen | 1.64 |
| Oxygen | 4.67 |
| Sulfur | 2.14 |
| Ash | 10.39 |

This char, at 950° F., is pressurized to 585 p. s. i. g. (about 40 atmospheres) and introduced directly into the gasification zone 70 maintained at 1520° F.

Preheated steam is further heated by indirect exchange with the hot gases leaving the gasification zone at 88 and is introduced at a temperature of 1490° F. into the gasification zone 70. For every 100 lbs. of char, 97.36 lbs. of steam enter the gasification zone where a steam conversion of 54.5 percent is achieved. The yield and composition of product gas per 100 lbs. of char is as follows:

|  | Volume percent wet basis [1] | S. c. f., 60° F., 1 atm./100 lb. char |
|---|---|---|
| $H_2$ | 29.6 | 915 |
| CO | 13.6 | 420 |
| $CO_2$ | 13.0 | 404 |
| $H_2O$ | 30.1 | -------- |
| $CH_4$ | 13.0 | 404 |
| $H_2S$ | 0.6 | 19 |
|  | 99.9 | 2,162 |

[1] The small quantities of $N_2$ have been omitted from the table.

Char is circulated continuously between the vessels 70 and 71 through conduits 73 and 76 at a rate of 1870 lbs. of char per 100 lbs. of char feed. For every 100 lbs. of char introduced, 27, 8 lbs. of solids residue having an ash content of 37.4 percent are removed from the system. In the hydrogenation zone 71, maintained at 1600° F. and 585 p. s. i. g., fluidization is maintained by the upward passage of recirculating gases which have been heated to 1490° F. by indirect exchange with the product hydrogenation gases at 87. Those recirculating gases, entering the hydrogenation zone 71 through conduit 77, have the following composition and volume:

*Feed Gas to hydrogenation zone*

|  | Volume percent | S. c. f., 60° F., 1 atm./100 lb. char |
|---|---|---|
| $H_2$ | 91.9 | 2,513 |
| CO | 8.1 | 220 |
| $CH_4$ | -------- | -------- |

The hydrogenation product gases issuing through conduit 86 have the following analysis and volume:

*Hydrogenation product gases*

|  | Volume percent | S. c. f., 60° F., 1 atm./100 lb. char |
|---|---|---|
| $H_2$ | 56.7 | 1,179 |
| CO | 10.6 | 220 |
| $CH_4$ | 32.7 | 680 |

Product gases from the vessels 70 and 71 are cooled to a final temperature of 800° F. by indirect heat exchange with incoming gases at 88 and 87 respectively. The two streams are combined and mixed with an additional 35.6 lbs. of steam (per 100 lbs. of char) produced by passing the partially cooled gases through a water spray tower (not shown) which also serves to remove finely divided solids from the vapors. The gaseous mixture is passed over an iron-chromia water gas shift catalyst at 760° F. Shifted gases are passed through a conventional ethanolamine gas scrubber for removal of $CO_2$ and $H_2S$ and thence to a low temperature separation stage where substantially all methane is removed by liquefaction. Product gas, essentially methane, evaporated to provide required refrigeration of incoming gases, amounts to 1080 s. c. f. (60° F., 1 atm.)/100 lbs. char. The gas has a gross heating value of about 1000 B. t. u./cu. ft. Uncondensed hydrogen and carbon monoxide are reheated in the indirect heat exchanger 87 and recirculated to the hydrogenation vessel 71.

Under these conditions, the combined hydrogenation-gasification reactions are sufficiently exothermic to maintain the gasification vessel at 1520° F. and the hydrogenation vessel at 1600° F. An additional heat release of 7200 B. t. u./100 lbs. char is available to compensate for heat losses from the system.

The steam conversion in the gasification zone in all cases should be maintained in excess of 40 percent to realize the benefits of thermoneutrality in the present invention. Steam conversion is defined as the ratio of converted steam to feed steam. The steam conversion is dependent upon the kinetics of gasification and also upon the gasification reaction equilibria. In general, increased gasification temperature promotes greater steam conversion by increasing the reaction rate and improving the reaction equilibria; increased pressure increases the reaction rate but renders the reaction equilibria less favorable to gasification. Thus a maximum achievable steam conversion depends upon the equilibria and kinetics associated with the conditions selected for the gasification reaction.

I have found that at low steam conversion rates the incidental quantity of methane produced in the gasification zone is small; thus at low steam conversion rates a corresponding higher heat load is placed upon the gasification zone. To realize the full benefit of the present invention, the steam conversion rate of the gasification zone should exceed 40 percent.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of preparing high B. t. u.-content gases from carbonaceous solids which comprises reacting carbonaceous solids with preheated steam at a conversion rate in excess of 40 percent in a gasification zone at a temperature in the range 1450 to 1600° F. and at a pressure exceeding 30 atmospheres, concurrently reacting carbonaceous solids with preheated hydrogen in a hydrogenation zone at a temperature in the range 1550 to 1700° F. and at a pressure exceeding 30 atmospheres, maintaining said hydrogenation zone at an average temperature of 20 to 100° F. above that of said gasification zone, transferring carbonaceous solids from said hydrogenation zone to said gasification zone, transferring carbonaceous solids from said gasification zone to said hydrogenation zone, recovering gaseous reaction products from each of said zones, reacting substantially all carbon monoxide therein with water to form carbon dioxide and hydrogen, thereafter removing therefrom substantially all carbon dioxide and hydrogen sulfide, recovering from the residue of said gaseous reaction products a high B. t. u.-content product gas and recycling the remainder of said gaseous reaction products as substantially pure hydrogen gas at an elevated temperature to said hydrogenation zone.

2. The method of preparing high B. t. u.-content gases from finely divided, reactive carbonaceous solids which comprises passing preheated steam upwardly through a gasification zone containing said solids maintained at a pressure in excess of 30 atmospheres and a temperature of 1450 to 1600° F. under fluidized reacting conditions to effect therein a steam conversion of at least 40 percent, concurrently passing preheated hydrogen gas upwardly through a hydrogenation zone containing said solids maintained at a pressure in excess of 30 atmospheres and a temperature of 1550 to 1700° F. under fluidized reacting conditions, recovering gaseous reactant products from said gasification and hydrogenation zones, reacting substantially all carbon monoxide therein with water to form carbon dioxide and hydrogen, thereafter removing therefrom substantially all carbon dioxide and hydrogen sulfide, separating the residue of said gaseous reactant products into a high B. t. u.-content product gas and a substantially pure hydrogen gas, recycling said substantially pure hydrogen gas at an elevated temperature to said hydrogenation zone, and circulating said solids between said zones so that the solids moving from said hydrogenation zone are 20 to 100° F. hotter than solids moving from said gasification zone.

3. The method of preparing high B. t. u.-content gases from finely divided reactive, carbonaceous solids comprising passing said solids in a fluidized state continuously firstly through a gasification zone at a temperature of 1450 to 1600° F. and secondly through a hydrogenation zone surrounding said gasification zone and maintained at a temperature of 1550 to 1700° F., and in open communication with said gasification zone at its top and at its bottom, maintaining both zones at a pressure exceeding 30 atmospheres, continuously passing said solids at a temperature about 20 to 100° F. hotter than the gasification zone temperature from said hydrogenation zone to said gasification zone, passing preheated steam upwardly through said gasification zone under fluidizing and reacting conditions to effect therein a steam conversion of at least 40 percent, passing preheated hydrogen gas upwardly through said hydrogenation zone under fluidizing and reacting conditions, recovering and combining as a single gas stream the product gases from both zones, reacting substantially all carbon monoxide therein with water to form carbon dioxide and hydrogen, thereafter removing substantially all carbon dioxide and hydrogen sulfide from said gas stream, recovering substantially pure hydrogen gas from the residue of said gas stream, recycling said hydrogen gas at an elevated temperature through said hydrogenation zone, and recovering the remainder of said gas stream as product high B. t. u. gas.

4. The method of preparing high B. t. u.-content gases from finely divided reactive, carbonaceous solids comprising passing preheated steam upwardly under reactive conditions sequentially through a plurality of vertically separated gasification zones containing said solids to effect therein a steam conversion of at least 40 percent, each of said gasification zones being maintained at a higher temperature than subjacent gasification zones, and all maintained at temperatures in the range 1450 to 1600° F. and at a pressure exceeding 30 atmospheres, concurrently passing preheated hydrogen gas upwardly under reactive conditions sequentially through a plurality of vertically separated hydrogenation zones containing said solids, each of said hydrogenation zones being maintained at a lower temperature than subjacent hydrogenation zones, and all maintained at temperatures in the range 1550 to 1700° F. and at a pressure exceeding 30 atmospheres, recovering reaction product gases from the uppermost gasification stage and from the uppermost hydrogenation stage, reacting substantially all carbon monoxide therein with water to form carbon dioxide and hydrogen, thereafter removing substantially all carbon dioxide and hydrogen sulfide from said reaction product gases, recovering high B. t. u.-content gas from the residue of said reaction product gases and recycling the remainder thereof as substantially pure hydrogen gas upwardly at an elevated temperature sequentially through said hydrogenation zones, circulating said solids sequentially downwardly through said gasification zones and downwardly through said hydrogenation zones, circulating said solids from the bottom gasification zone to the uppermost hydrogenation zone and from the bottom hydrogenation zone to the uppermost gasification zone, and maintaining the temperature of said bottom hydrogenation zone 20 to 100° F. above that of said uppermost gasification zone.

5. The method of preparing high B. t. u.-content gases from carbonaceous solids comprising establishing a plurality of reaction zones containing said solids under a pressure in excess of 30 atmospheres, introducing preheated steam under endothermic reactive conditions in a sequential cycle into those of said zones maintained at a temperature in the range 1450 to 1600° F. to effect therein a steam conversion of at least 40 percent, introducing preheated hydrogen under exothermic reactive conditions in a sequential cycle into the remainder of said zones maintained at a temperature of 1550 to 1700° F., maintaining each of said zones sequentially at a temperature in the range 1450 to 1600° F. and thereafter at a temperature in the range 1550 to 1700° F., recovering product gases from all of said zones, reacting substantially all carbon monoxide therein with water to form carbon dioxide and hydrogen, thereafter removing substantially all carbon dioxide and hydrogen sulfide from said product gases, recovering from the residue of said product gases a high B. t. u.-content gas and recycling the remainder thereof as substantially pure hydrogen gas into said remainder of said zones.

References Cited in the file of this patent

UNITED STATES PATENTS

| | | |
|---|---|---|
| 2,609,283 | Kalbach | Sept. 2, 1952 |
| 2,654,661 | Gorin | Oct. 6, 1953 |
| 2,759,806 | Pettyjohn | Aug. 21, 1956 |